(12) United States Patent
Tennevall et al.

(10) Patent No.: US 10,018,074 B2
(45) Date of Patent: Jul. 10, 2018

(54) TURBOCOMPOUND UNIT

(71) Applicant: VOLVO TRUCK CORPORATION, Göteborg (SE)

(72) Inventors: Peter Tennevall, Malmö (SE); Daniel Blom, Malmö (SE); Niklas Hartler, Tygelsjö (SE)

(73) Assignee: Volvo Truck Corporation, Göteborg (SE)

( * ) Notice: Subject to any disclaimer, the term of this patent is extended or adjusted under 35 U.S.C. 154(b) by 152 days.

(21) Appl. No.: 15/121,452

(22) PCT Filed: Feb. 26, 2015

(86) PCT No.: PCT/EP2015/054010
§ 371 (c)(1),
(2) Date: Aug. 25, 2016

(87) PCT Pub. No.: WO2015/128413
PCT Pub. Date: Sep. 3, 2015

(65) Prior Publication Data
US 2016/0356179 A1    Dec. 8, 2016

Related U.S. Application Data

(63) Continuation-in-part of application No. PCT/EP2014/000498, filed on Feb. 26, 2014.

(51) Int. Cl.
*F01D 11/02* (2006.01)
*F01D 25/18* (2006.01)
*F02B 41/10* (2006.01)

(52) U.S. Cl.
CPC ............ *F01D 25/183* (2013.01); *F01D 11/02* (2013.01); *F02B 41/10* (2013.01);
(Continued)

(58) Field of Classification Search
CPC ........ F04D 29/124; F04D 11/04; F02B 37/00; F01D 25/22; F01D 25/30; F02C 6/12
See application file for complete search history.

(56) References Cited

U.S. PATENT DOCUMENTS

| | | | | |
|---|---|---|---|---|
| 6,966,191 | B2 * | 11/2005 | Fukutani | .................. F01D 3/02 60/39.08 |
| 7,624,580 | B2 * | 12/2009 | Fukutani | ................. F01D 5/082 60/39.08 |

(Continued)

FOREIGN PATENT DOCUMENTS

DE    102005047216 A1    4/2007

OTHER PUBLICATIONS

International Search Report (dated May 21, 2015) for corresponding International App. PCT/EP2015/054010

*Primary Examiner* — Mark Laurenzi
*Assistant Examiner* — Shafiq Mian
(74) *Attorney, Agent, or Firm* — WRB-IP LLP (57) ABSTRACT

A turbocompound unit includes a bearing housing and a turbine shaft being rotatably supported in the bearing housing, wherein one end of the turbine shaft is provided with a turbine wheel. The turbocompound unit further includes a diffuser duct in which the turbine wheel is arranged to rotate, an exhaust collector extending from the diffuser duct to an exhaust outlet, and a sealing arrangement positioned in the vicinity of the turbine wheel for preventing oil from escaping from the bearing housing to the diffuser duct. The exhaust collector forms part of a buffer gas duct that is arranged to supply exhaust gas from the exhaust collector to the sealing arrangement for pressurizing the sealing arrangement.

17 Claims, 6 Drawing Sheets

US 10,018,074 B2

Page 2

(52) U.S. Cl.
CPC ...... *F05D 2220/40* (2013.01); *F05D 2240/50* (2013.01); *F05D 2240/55* (2013.01); *F05D 2240/60* (2013.01); *F05D 2250/38* (2013.01); *F05D 2260/6022* (2013.01); *Y02T 10/163* (2013.01)

(56) References Cited

U.S. PATENT DOCUMENTS

| | | | | |
|---|---|---|---|---|
| 7,997,057 | B1* | 8/2011 | Harris | F01D 25/125 384/476 |
| 8,453,465 | B2* | 6/2013 | Baldaccini | F01D 25/125 415/115 |
| 8,544,268 | B2* | 10/2013 | Begin | F01D 25/16 184/6.11 |
| 8,938,975 | B2* | 1/2015 | Behaghel | F01D 3/04 415/208.2 |
| 9,617,916 | B2* | 4/2017 | Legare | F01D 11/04 |
| 9,664,098 | B2* | 5/2017 | Maas | F02C 6/12 |
| 2004/0112054 | A1* | 6/2004 | Larsson | F01D 11/06 60/611 |
| 2012/0328418 | A1 | 12/2012 | Yang et al. | |
| 2015/0044023 | A1* | 2/2015 | Schlarb | F02B 39/16 415/11 |

* cited by examiner

TURBOCOMPOUND UNIT

BACKGROUND AND SUMMARY

The invention relates to a turbocompound unit as well as to a method for providing such turbocompound unit. More specifically the present invention relates to a turbocompound unit having a sealing arrangement for preventing oil from escaping from a bearing housing to a diffuser duct.

The invention can be applied in heavy-duty vehicles, such as trucks. Although the invention will be described with respect to a truck, the invention is not restricted to this particular vehicle, but may also be used in other vehicles for which the provision of a turbocompound unit is advantageous such as buses and construction equipment.

A turbocompound unit is a vehicle component used for recovering a part of the energy of the exhaust gas flow and to convert that energy into a rotational movement of a shaft. The rotational movement of the shaft is transferred as a torque increase to the crankshaft of the engine of the vehicle. Normally, the turbocompound unit has a shaft wherein a turbine wheel is arranged at one distal end. When the internal combustion engine is running exhaust gas will flow into the turbocompound unit and cause the turbine wheel to rotate. Hence, the shaft of the turbocompound unit will rotate accordingly. The opposite end of the shaft is provided with a gear wheel which meshes with additional gears for causing a rotational connection between the shaft and the crankshaft. When the shaft is rotating due to exhaust gas flowing through the turbocompound unit, the rotational energy of the shaft will be transferred to the crankshaft as a torque increase.

The use of turbocompound units has proven to provide significant advantages on driving economics as well as on the environment the energy recovery from the exhaust gas flow will in fact reduce the fuel consumption of the vehicle.

The turbine shaft is supported in a bearing housing for allowing the turbine shaft to rotate relative the housing. In order to minimize hot gas inflow from the gas path into the bearing housing as well as to prevent oil leakage in a reverse direction, sealing rings are used to seal between the static bearing housing and the rotating turbine shaft. As the static pressure level downstream the turbine wheel in some operating modes can be lower than the pressure inside the bearing housing a buffer air pressure is needed to prevent oil leakage.

It is known for example from document DE 10 2005 047 216 A1 to seal the turbine shaft by means of pressurised air. The pressurised air is supplied to a region of the shaft that is axially delimited by two sealing elements. This solution is relatively complex, and it requires reliable supply of pressure controlled air from an air compressor, as well as two high performance sealing elements. There is thus a need for a simplified sealing arrangement for a turbocompound unit, where the above mentioned disadvantages are removed.

It is desirable to provide a turbocompound unit overcoming the above mentioned drawbacks of prior art units.

By the provision of a turbocompound unit in which a sealing arrangement is pressurized by using exhaust gas from the collector it is possible to maintain a positive air flow into the bearing housing during the entire operation cycle.

According to an aspect, a turbocompound unit is provided. The turbocompound unit comprises a bearing housing and a turbine shaft being mutably supported in the bearing housing, wherein one end of the turbine shaft is provided with a turbine wheel. The turbocompound unit further comprises a diffuser duct in which the turbine wheel is arranged to rotate, an exhaust collector extending from the diffuser duct to an exhaust outlet, and a sealing arrangement positioned in the vicinity of the turbine wheel for preventing oil from escaping from the bearing housing to the diffuser duct. The exhaust collector forms part of a buffer gas duct that is arranged to supply exhaust gas from the exhaust collector to the sealing arrangement for pressurizing the sealing arrangement.

According to another aspect, a turbocompound unit is provided. The turbocompound unit comprises a bearing housing and a turbine shaft being rotatably supported in the bearing housing, wherein one end of the turbine shaft is provided with a turbine wheel. The turbocompound unit further comprises a diffuser duct in which the turbine wheel is arranged to rotate, an exhaust collector extending from the diffuser duct to an exhaust outlet, and a sealing arrangement positioned in the vicinity of the turbine wheel for preventing oil from escaping from the bearing housing to the diffuser duct. A buffer gas duct leads into the exhaust collector, whereby the buffer gas duct is arranged to supply exhaust gas from the exhaust collector to the sealing arrangement for pressurizing the sealing arrangement.

The following embodiments provide advantages for both aspects presented above.

According to an embodiment the exhaust collector forms an annular flow path for the exhaust gases whereby it allows a part of the buffer gas duct to be formed at a specific angular position relative the exhaust outlet. The angular position may thus correspond to the angular position at which the exhaust gas pressure is at its maximum.

According to further embodiment the buffer gas duct extends from a buffer gas inlet arranged at the outer periphery of the exhaust collector. Hence the gas inlet is in fluid communication with the volume inside the exhaust collector and the buffer gas duct may be constructed to extend from the gas inlet without interfering with the volume inside the exhaust collector.

According to a yet further embodiment the buffer gas inlet is arranged 170°-190° from the exhaust outlet, preferably approximately 180° from the exhaust outlet. The buffer gas inlet, is thus arranged at a circumferential position of 170°-190°, and preferably 180° measured from the circumferential position of a center of the exhaust outlet. This angular position has been proven to correspond to the maximum pressure inside the exhaust collector.

According to an embodiment the exhaust collector has an axial extension and the buffer was inlet may be positioned centrally along the axial extension.

According to an embodiment the buffer gas duct comprises a channel inside a wall of the exhaust collector. This is advantageous in that the need for additional components, such as pipes, fittings, etc is removed.

According to a further embodiment the diffuser duct comprises an outer diffuser duct wall and an inner diffuser duct wall extending essentially parallel to the outer diffuser duct wall, and wherein the inner and outer diffuser duct walls jointly define at least a part of the buffer gas duct. Hence the volume formed between the inner and outer diffuser duct wall may be used to form part of the buffer gas duct.

According to a yet further embodiment the sealing arrangement comprises an annular pressure cavity surrounding the turbine shaft, and wherein the annular pressure cavity is in fluid connection with the buffer gas duct. The pressure cavity thus forms an annular sealing since the high pressure inside the cavity is always maintained due to the supply from the exhaust collector via the buffer gas duct.

According to an embodiment the annular pressure cavity is arranged between two seals being spaced-apart axially along the turbine shaft, and at least one of the seals may be a labyrinth seal. Hence the pressure inside the cavity will be maintained at a higher level than inside the bearing housing.

The sealing arrangement may further comprise an annular buttes cavity surrounding the turbine shaft, and wherein the annular buffer cavity is spaced-apart from the annular pressure cavity in an axial direction. The annular buffer cavity is preferably arranged on the turbine shaft gear wheel side of the annular pressure cavity, whereby dynamic behaviour of oil splash etc from the bearing housing will be accommodated by the annular buffer cavity. The risk of oil leakage into the diffuser will thus be further decreased.

According to a yet further embodiment the annular buffer cavity is arranged between two seals being spaced-apart axially along the turbine shaft, and wherein one of the two seals is sealing the annular pressure cavity from the annular buffer cavity. By allowing the annular pressure cavity and the annular buffer cavity to share a common sealing the complexity of the construction is reduced.

The annular buffer cavity may in some embodiments be formed by a seal land being supported by an oil slinger and/or a seal ring carrier. The seal land may comprise a through hole for draining fluid entering the annual buffer cavity.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
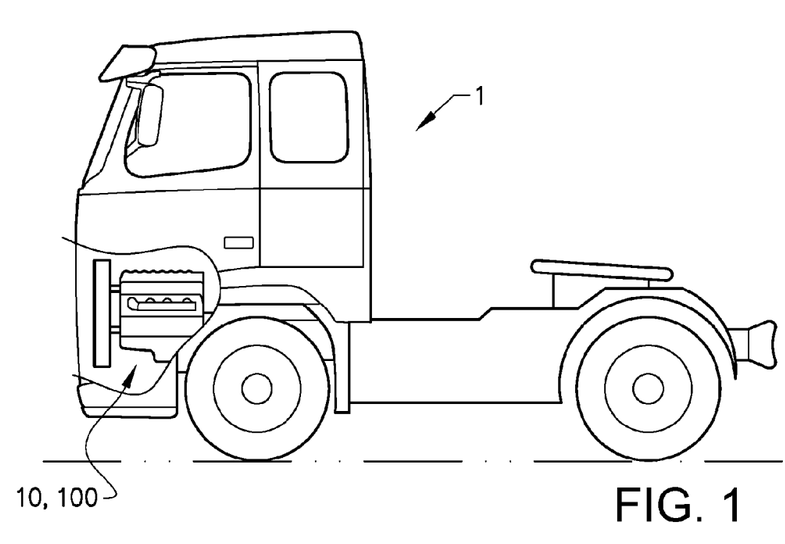
FIG. 1 is a side view of a vehicle according to an embodiment.

Starting with FIG. 1 a vehicle 1 is shown. The vehicle 1, which is illustrated as a truck, has an internal combustion engine 10 for driving the vehicle 1. As will be further explained below the internal combustion engine 10 of the vehicle 1 is provided with a turbocompound unit 100 according to various embodiments. The vehicle 1 may have additional propulsion units, such as electric drives etc. as long as it has at least one engine providing a flow of exhaust gases interacting with the turbocompound unit 100. Hence the vehicle 1 is not exclusively a truck but may also represent various heavy duty vehicles such as buses, constructional equipment, etc.

Figure 2:
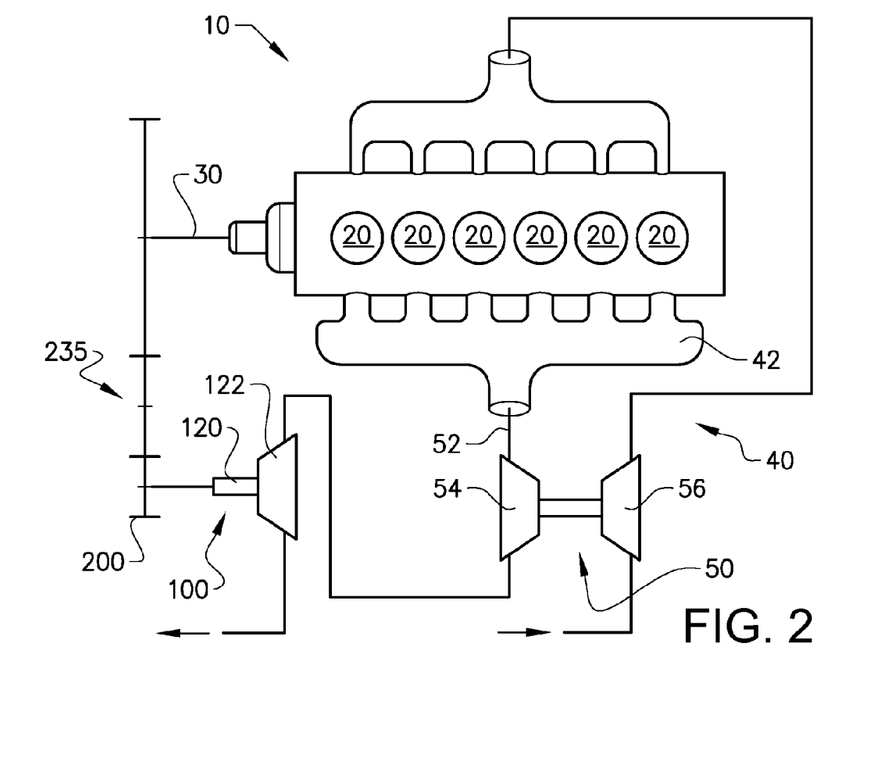
FIG. 2 is a schematic view of an internal combustion engine according to an embodiment.

In FIG. 2 an example of an internal combustion engine 10 is shown. The internal combustion engine 10 includes a plurality of cylinders 20 operated to combust fuel, such as diesel or gasoline, whereby the motion of pistons reciprocating in the cylinders 20 is transmitted to a rotation movement of a crank shaft 30. The crank shaft 30 is further coupled to a transmission (not shown) for providing a torque to driving elements (not shown). In case of a heavy vehicle, such as a truck, the driving elements are wheels; however the internal combustion engine 10 may also be used for other equipment such as construction equipment, marine applications, etc.

The internal combustion engine 10 further comprises an exhaust gas system 40, which system 40 serves the purpose of recovering at least some of the energy in the exhaust gas flow to improve the performance of the internal combustion engine 10. In the shown example the exhaust gas exits the cylinders 20 and enters a manifold 42 which is further connected to an inlet 52 of a turbo charger 50. The exhaust gas flow causes a turbine wheel 54 to rotate, which rotation is translated to a corresponding rotation of a compressor wheel 56 being used to compress incoming air before it is introduced in the cylinders 20. The structural as well as functional specifications of a turbocharger 50 are well known in the art and will not be described in further details.

The exhaust gas exits the turbocharger 50 and flows to a turbocompound unit 100, optionally via an exhaust gas regulator (not shown). The incoming exhaust gas, from which some energy have already been used to drive the turbine wheel 54 of the turbo charger 50, is guided to pass a turbine wheel 122 of the turbocompound unit 100, thus causing the turbine wheel 122 and an associated turbine shaft 120 to rotate. A gear wheel 200 is fixedly arranged on the turbine shaft 120 and meshes with further gearings 205 in order to couple the turbine shaft. 120 to the crankshaft 30. Hence, when the turbine wheel 122 is forced to rotate the turbine shaft 120 will provide an additional torque to the crankshaft 30.

Figure 3:
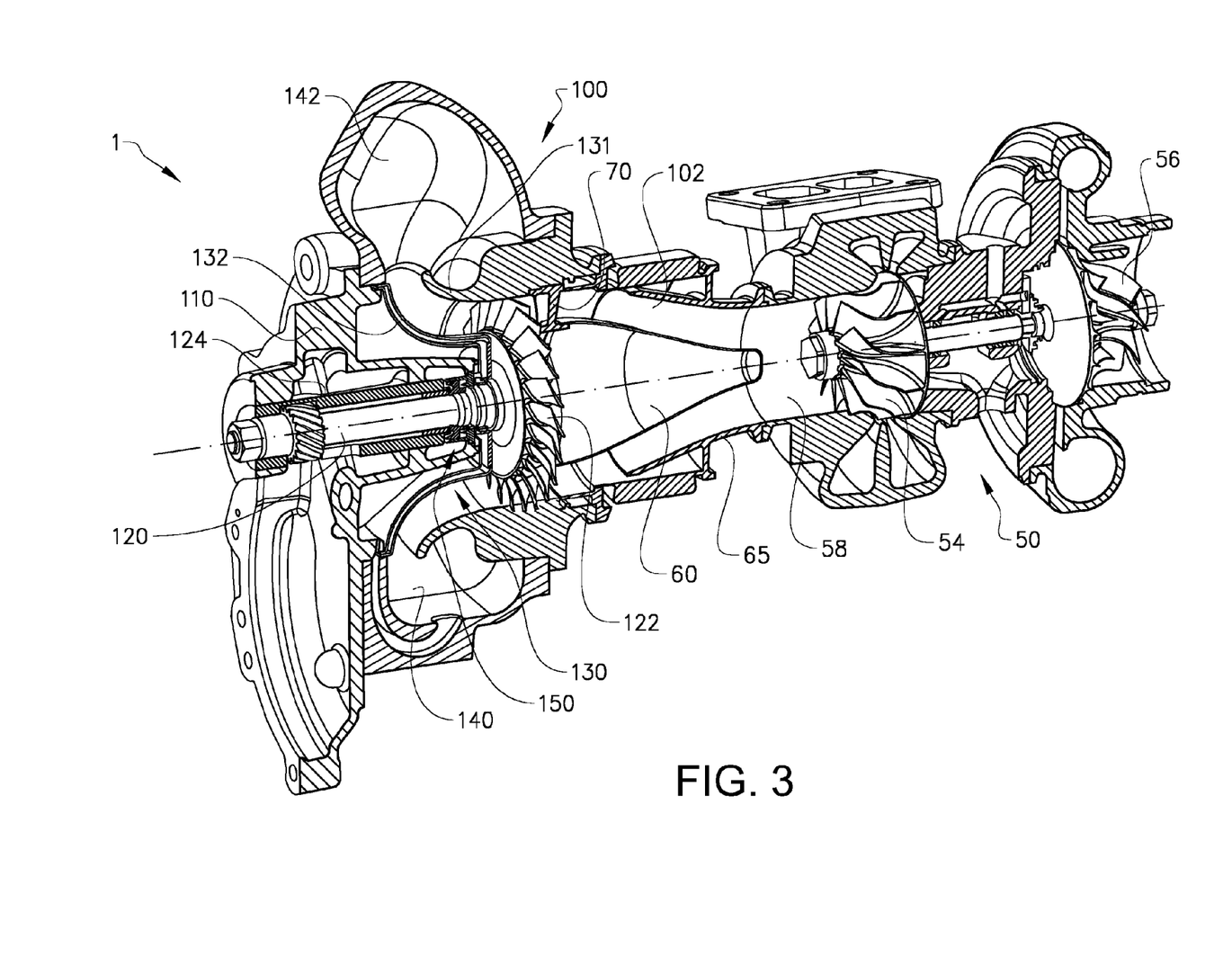
FIG. 3 is an isometric cross-sectional view of a part of a turbocharger and a part of a turbocompound unit according to an embodiment.

With reference to FIG. 3 an embodiment of a turbocompound unit will be described. FIG. 3 shows a part of an exhaust as system comprising a turbocharger and a turbocompound unit. The turbocompound unit 100 is arranged in series with a turbo charger 50, although other embodiments do not include such provision of the turbo charger 50.

Exhaust gas leaving an outlet 58 of the turbo charger 50 is directed to an axial-flow turbine wheel 122 of the turbocompound unit 100. The exhaust gas exhibits a pressure drop and temperature decrease between an inlet 102 and an outlet 140 of the turbocompound unit 100, which is converted by the turbine wheel 122 into kinetic energy that is supplied to the engine crankshaft 30 (see FIG. 2).

The turbocompound unit 100 comprises a bearing housing 110, an exhaust diffuser duct 130 for conveying exhaust gas from the inlet 102 to an annular exhaust collector 140, a turbine wheel 122 with blades positioned in the diffuser duct 130, a shaft 120 rigidly connected to the turbine wheel 122 and rotatably supported in the housing 110 by means of bearings 124.

In accordance with the embodiment shown in FIG. 3 exhaust gas entering the inlet 102 of the turbocompound unit 100 from the turbo charger 50 is first guided by an inner duct diffuser 60 and an outer duct diffuser 65 towards a stationary annular vane array 70 located upstream the turbine wheel 122. The exhaust gas then passes the blades of the turbine wheel 122, which blades are shaped such that the turbine wheel 122 is caused to rotate. After having past the turbine wheel 122, the exhaust diffuser duct 130 and into the annular collector 140, the exhaust gas flow velocity decreases a certain degree, and the static exhaust gas pressure increases correspondingly.

The exhaust diffuser duct 130 conveying the exhaust gas from the turbine wheel 122 to the annular exhaust collector 140 may e.g. be formed of an outer and inner annular sleeve portions 131, 132 that have a trunco-conical curved shape, or a bell-mouthed shape, such that exhaust gas flow may be efficiently redirected from an axial flow direction when passing the turbine wheel 122 to a more radial flow direction upon entering annular exhaust collector 140, all by eliminating losses as far as possible. The inner sleeve portion 132 may have many functions. It may function as guiding wall for the exhaust gas. It may also function as heat shield for preventing the housing 110, bearings 124 and lubrication oil from excessive heating due to the hot exhaust gases. Moreover, in case the inner sleeve portion 132 is formed as a double wall construction as is shown in FIG. 3 it may also function as part of a buffer gas duct, as will be explained more in detail below.

Figure 4:
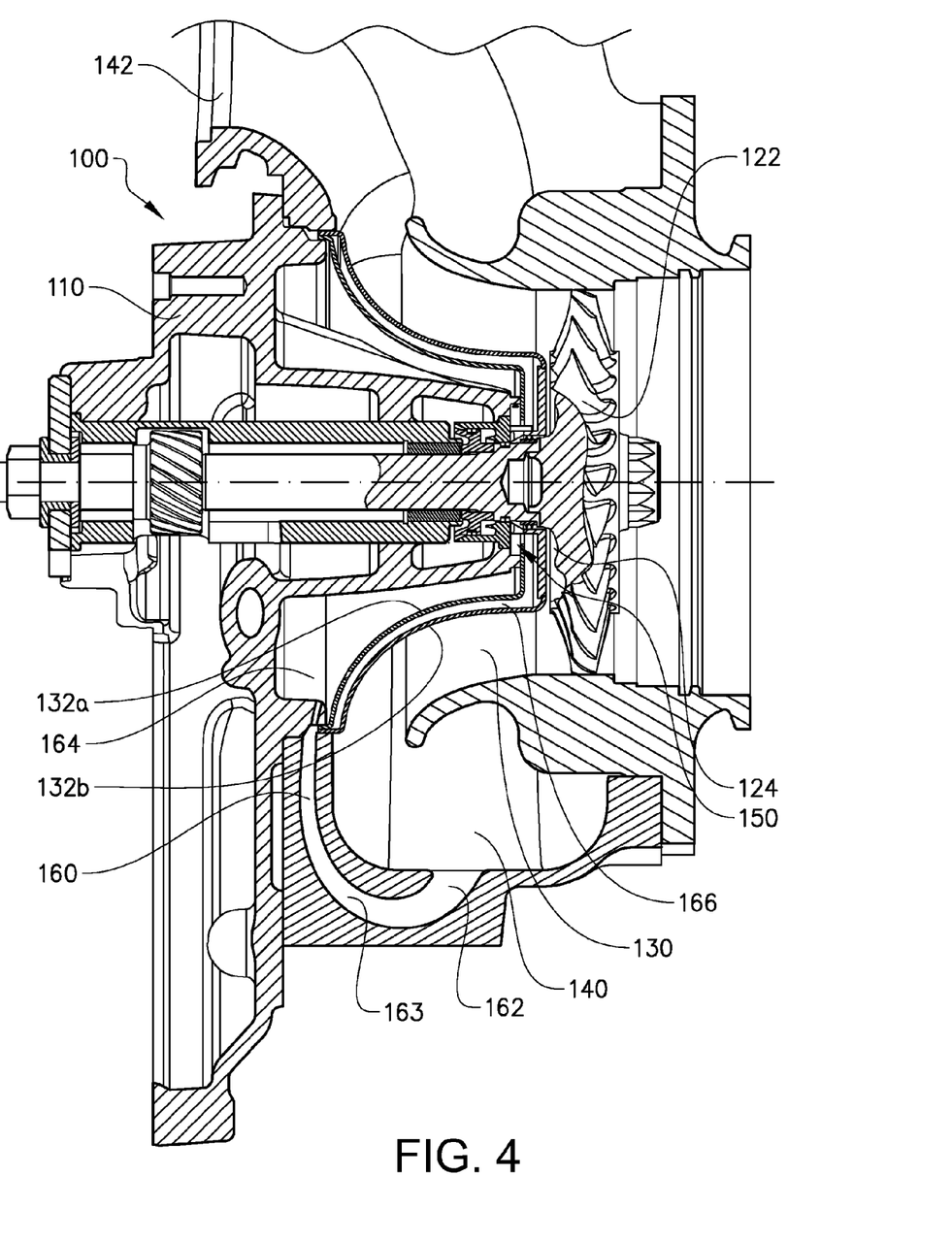
FIG. 4 is a cross-sectional view of a part of the turbocompound unit shown in FIG. 3.
Figure 5:
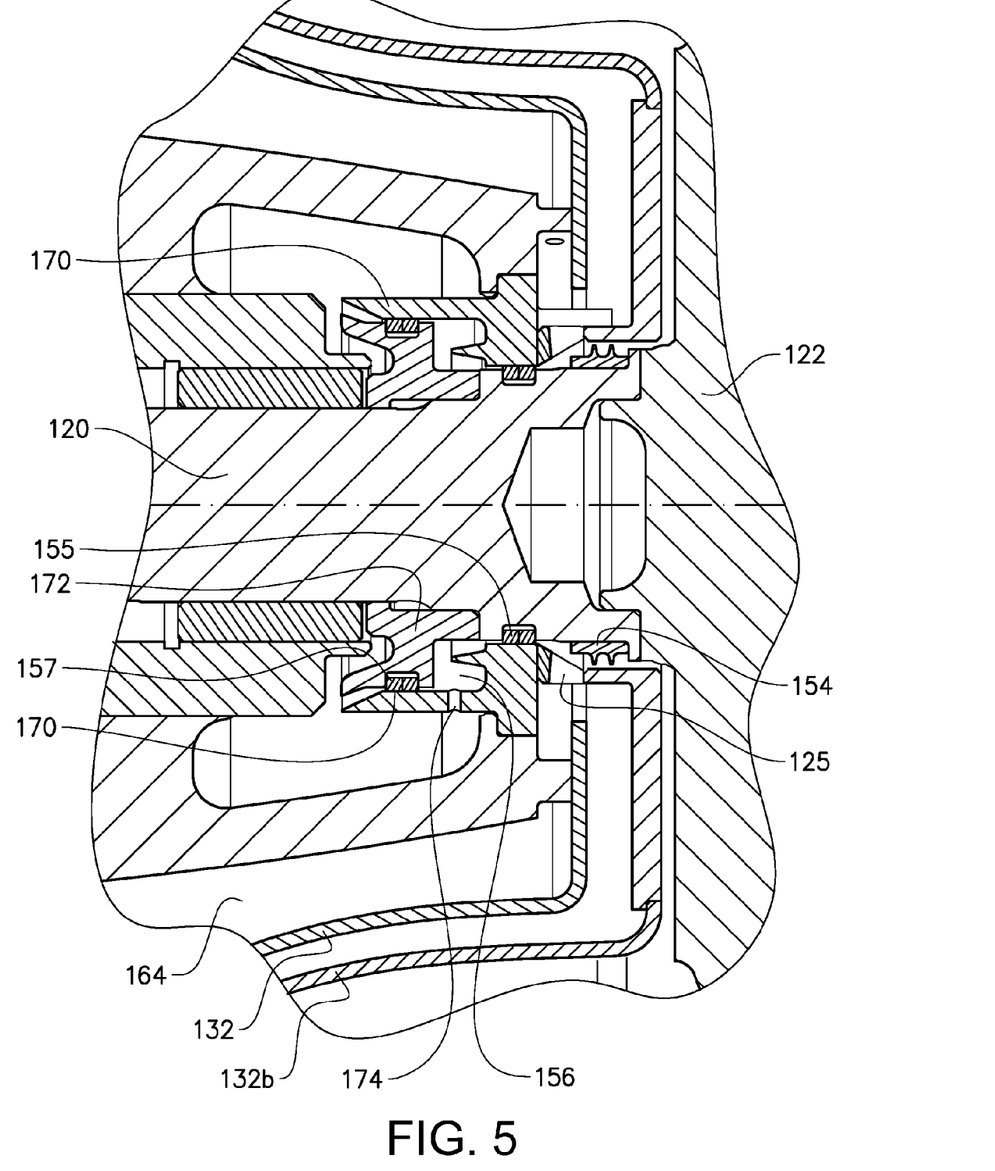
FIG. 5 is a cross-sectional view of a part of the turbocompound unit shown in FIGS. 3 and 4, and FIGS. 6a-c are diagrams showing the pressure at different positions of a turbocompound unit.

As show more in detail in FIGS. 4 and 5, the turbocompound unit 100 comprises an oil sealing system with a sealing arrangement 150 positioned in the vicinity of the turbine wheel 122 for preventing lubrication oil from escaping from the inside of the bearing housing 110 along the shaft 120 into the exhaust gas stream, which passes axially past the turbine wheel 122. The turbine wheel 122 rotates with a significant speed, for example up to about 50 000 rpm, thereby generating a reduced exhaust gas pressure at a radially inner region of the turbine wheel 122 compared to the exhaust gas pressure at a radially outer region of the turbine wheel 122. This difference in exhaust gas pressure is caused partly by centrifugal forces acting on the exhaust gas located close the turbine wheel 122. At the same time, the oil mist pressure at the inner side of the housing 110 varies with oil pump operation etc., and is during certain operating conditions higher than the exhaust gas pressure at the inner region of the turbine wheel 122. This pressure difference may generate an oil leakage out from the inside of the housing 110 into the exhaust gas stream. The leaked oil then mix with the exhaust gas causing increased emissions, increased lubrication oil consumption, and/or poisoning of the exhaust aftertreatment system.

The oil sealing system comprises a buffer gas duct 160 that is arranged to supply exhaust gas from the exhaust collector 140 to the sealing arrangement 150 for pressurizing the sealing arrangement 150. A pressurized sealing arrangement 150 that has a pressure above the oil mist pressure at the inner side of the housing 110 effectively prevents any oil leakage along the shaft 120.

As can be seen in FIGS. 3 and 4 the exhaust collector 140 forms part of the buffer gas duct 160 that is arranged to supply exhaust gas from the exhaust collector 140 to the sealing arrangement 150 for pressurizing the sealing arrangement 150. Hence the buffer gas duct 160 leads into the exhaust collector 140. A buffer gas inlet 162 is arranged at the outer periphery of the exhaust collector 140 whereby the buffer gas duct 160 extends from the inlet 162 to the sealing arrangement 150. According to an embodiment the buffer gas inlet 162 is arranged 170°-190° from the exhaust outlet 142, and preferably approximately 180° from the exhaust outlet 142 i.e., at the lower part of the exhaust collector 140. That is, the buffer gas inlet 162 is arranged at a circumferential position of 170°-190°, and preferably 180° measured from the circumferential position of a center of the exhaust outlet 142.

As can be seen in FIG. 4 the exhaust collector 140 has an axial extension, i.e. an extension in the same direction as the axial direction of the turbine shaft 120. In a preferred embodiment the buffer gas inlet 162 is positioned centrally along the axial extension of the exhaust collector 140. The exhaust collector 140 thus forms part of the buffer gas duct 160. In FIG. 4 an embodiment is shown in which the buffer gas duct 160 extends from the inlet 162 and through a channel 163 formed in the side wall of the exhaust collector 140. The buffer gas duct 160 continues through the cavity 164 between the housing 110 and the inner annular sleeve portion 132 of the diffuser duct 130 and enters a channel 166 formed between an inner diffuser duct wall 132a and an outer diffuser duct wall 132b. Pressurized exhaust gas is supplied to the sealing arrangement 150 at the end of the channel 166.

Measuring results and tests have shown that the highest pressure downstream the turbine wheel 122 inside the exhaust collector is approximately 180° from the exhaust outlet 142, i.e. at the bottom position of the exhaust collector 140. During operation it has been proven that the static pressure in this area is always higher than the static pressure inside the bearing housing 110, as well as than the pressure in the cavity 124 behind the turbine wheel 122 and the bearing housing 110.

Different embodiments of the buffer gas duct 160 may be realized, as long as the exhaust collector 140 forms part of the buffer gas duct 160 in such way the static pressure inside the exhaust collector 140 is applied to the sealing arrangement. That is, the buffer gas duct 160 leads into the exhaust collector 140 for supplying exhaust gas from the exhaust collector 140 to the sealing arrangement 150. As is shown in FIG. 4 the buffer gas duct 160 extends from the exhaust collector 140 via pipes or casted or drilled channels in the exhaust collector 140 and the bearing housing 110. The pipe and channel dimension may in this case be large enough to minimize the pressure drop in the feeding channels. From this the pressure may be fed to the sealing arrangement 150 via the cavity 164 between the bearing housing 110 and the inner annular sleeve portion 132, and thereafter within the double wall sleeve portion formed by the diffuser duct walls 123a, 132b. From here the pressure is fed into a cavity 152 between outer pair of sealing rings 155 and a labyrinth seal 154 being mounted on the turbine shaft 120 for maintaining a sufficient pressure level in this cavity. However, should a single wall construction be used for the inner sleeve portion 132 the pressure may be fed to the sealing arrangement 150 via the cavity 164 between the bearing housing 110 and the inner sleeve portion 132.

As is readily understood the channel 163, formed in the side wall of the exhaust collector 140, may be replaced by a separate pipe or conduit extending through and outside the exhaust collector 140 and connecting with the cavity 164 between the bearing housing 110 and the annular sleeve portions 132a, 132b.

So far, the configuration of the buffer gas duct 160 has been described. In FIG. 5 the sealing arrangement 150 is shown in further details and it will from hereon be described. The sealing arrangement 150 comprises the annular pressure cavity 152 surrounding the turbine shaft 120. The annular pressure cavity 152 is in fluid connection with the buffer gas duct 160 and hence also the exhaust collector 140. As can be seen in FIG. 5 the cavity 152 is delimited by the turbine shaft 120, the inner annular sleeve portion 132 of the diffuser duct 130, and the bearing housing 110. The turbine shaft 120 seals against the inner annular sleeve portion 132 by means of a sealing 154, such as a labyrinth seal which in some embodiments may be formed integrally with the turbine shaft 120. Further to this, the turbine shaft 120 seals against the bearing housing 110 by means of a sealing ring 155 and a seal land 170 which in some embodiments may be formed integrally with the bearing housing 110. According to this embodiment the sealing 154 is axially spaced apart from the sealing 155.

As is further shown in FIG. 5 the sealing arrangement 150 further comprises an annular buffer cavity 156 surrounding the turbine shaft 120. The annular buffer cavity 156 is spaced apart from the annular pressure cavity 152 in an axial direction and it is arranged between the seal 155 and an additional seal 157 being spaced-apart axially along the turbine shall 120 such as the seal 155 is sealing the annular pressure cavity 152 from the annular buffer cavity 156. The additional seal 157 is formed between the seal land 170 and an oil slinger 172 which is provided for forcing lubrication oil radially outwards and away from the sealing arrangement 150. The oil slinger 172 is supported by the turbine shaft 120 such that the oil slinger 172 rotates with the turbine shaft 120. In some embodiments the oil slinger 172 is integrally formed with the turbine shaft 120.

The buffer gas duct 160 will provide a positive air flow into the bearing housing 110, i.e. into the cavity 152 during the entire operating cycle. However, the positive air flow will in some operating conditions be quite low which means that oil leakage due to dynamic force and/or oil spray in the bearing housing could still be a problem. Therefore the small positive air flow is combined with the buffer cavity 156 forming a "quiescent room" just inside the outer pair of sealing rings 155. Any small amount of oil which may enter this buffer cavity 156 may be drained back into the bearing housing 110 via a through hole 174 in bottom of the static seal land 170, together with the small amount of leakage air flow passing through the outer pair of sealing rings 155.

Figure 6A:
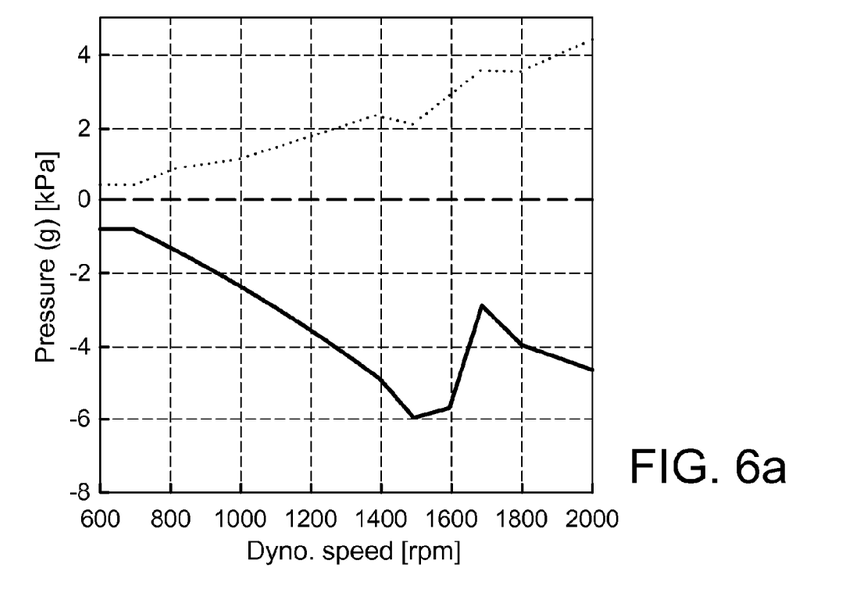

FIG. 6a is a diagram showing the static pressure versus speed at no fuelling motoring mode, which is known to be the worst case regarding pressure at a position just behind the turbine wheel 122, i.e. at cavity 124 (see FIG. 4). The dashed line represents the pressure inside the bearing housing 110, i.e. at cavity 164 (see FIG. 5). The solid line represents the pressure behind the turbine wheel 122, i.e. at cavity 124, while the dotted line represents the pressure at the exhaust collector outlet 142. From FIG. 6a it is completely clear that it is necessary to provide a sealing arrangement 150 for preventing leakage.

Figure 6B:
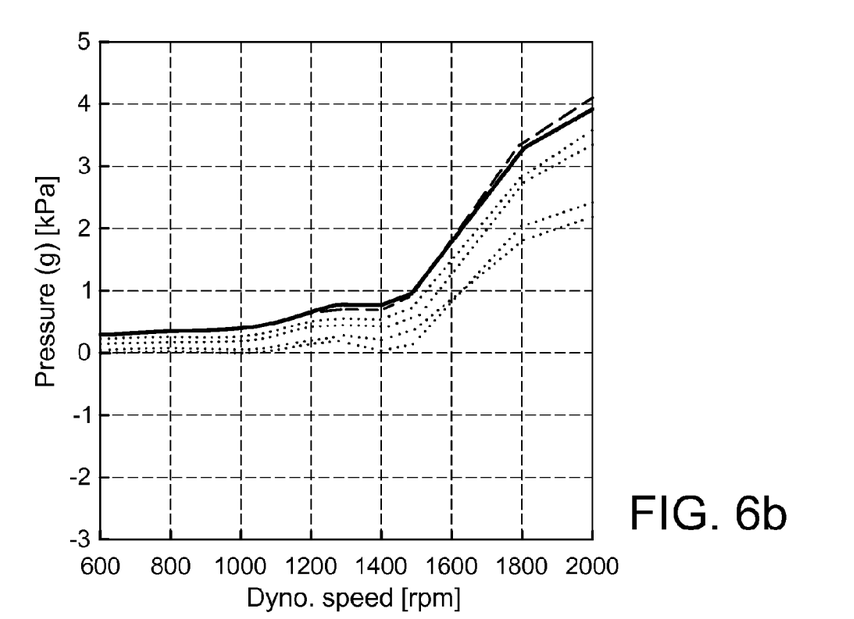

FIG. 6b is a diagram showing the pressure at various positions in the exhaust collector 140. The solid line represents the pressure at the exhaust collector outlet 142, while the dashed line represents the pressure approximately 180° from the outlet 142, i.e. at the position of the buffer gas duct inlet 162. The dotted lines represent the pressure at various positions along the exhaust collector inner periphery. From this diagram it is clear that the maximum pressure is obtained approximately 180° from the exhaust collector outlet 142.

Figure 6C:
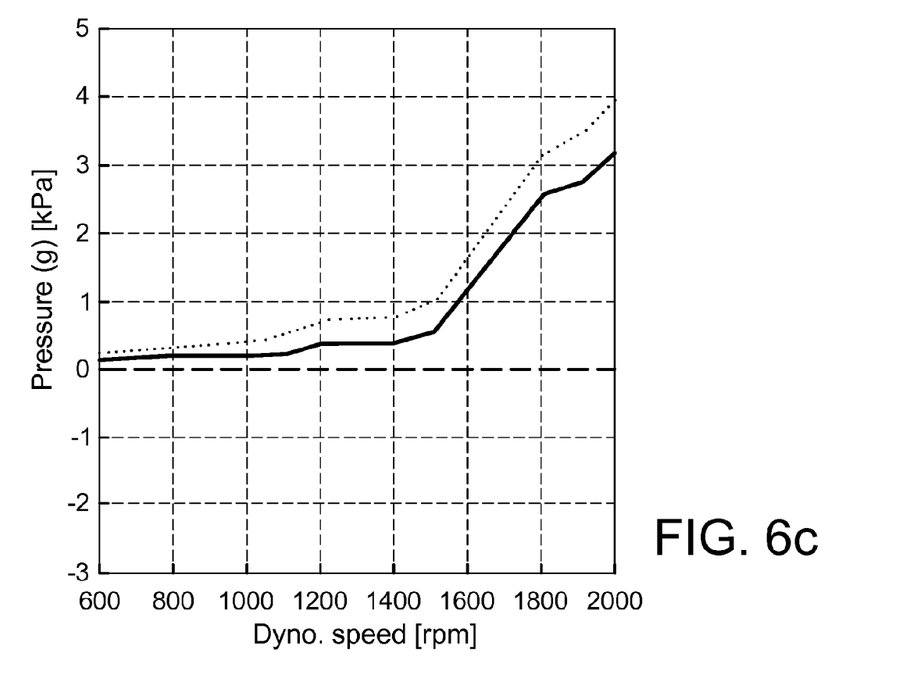

FIG. 6c is a diagram showing the pressure at the annular cavity 152. This pressure, indicated by the solid line, is higher than the pressure inside the bearing housing 110, which pressure is indicated by the dashed line. The dotted line represents the pressure at the exhaust collector outlet 142. FIG. 6c shows that the pressure is always higher inside the cavity 152 than in the bearing housing 110, thus reducing the risk of leakage.

It is to be understood that the present invention is not limited to the embodiments described above and illustrated in the drawings; rather, the skilled person will recognize that many changes and modifications may be made within the scope of the appended claims.

The invention claimed is:

1. A turbocompound unit comprising
a bearing housing and a turbine shaft being rotatably supported in the bearing housing, wherein one end of the turbine shaft is provided with a turbine wheel, the turbocompound unit further comprising
a diffuser duct in which the turbine wheel is arranged to rotate, an exhaust collector extending from the diffuser duct to an exhaust outlet, and
a sealing arrangement positioned in the vicinity of the turbine wheel for preventing oil from escaping from the bearing housing to the diffuser duct, and
a buffer gas duct leads into the exhaust collector, whereby the buffer gas duct is arranged to supply exhaust gas from the exhaust collector to the sealing arrangement for pressurizing the sealing arrangement.

2. The turbocompound unit according to claim 1, wherein the exhaust collector forms an annular flow path for the exhaust gases.

3. The turbocompound unit according to claim 2, wherein the buffer gas duct extends from a buffer gas inlet arranged at the outer periphery of the exhaust collector.

4. The turbocompound unit according to claim 3, wherein the buffer gas inlet is arranged at a circumferential position of 170°-190° measured from the circumferential position of a center of the exhaust outlet.

5. The turbocompound unit according to claim 4, wherein the buffer gas inlet is arranged at a circumferential position of approximately 180° measured from the circumferential position of a center of the exhaust outlet.

6. The turbocompound unit according to claim 3, wherein the exhaust collector has an axial extension and wherein the buffer gas inlet is positioned centrally along the axial extension.

7. The turbocompound unit according to claim 1, wherein the buffer gas duct comprises a channel inside a wall of the exhaust collector.

8. The turbocompound unit according to claim 1, wherein the diffuser duct comprises an inner diffuser duct wall and an outer diffuser duct wall extending essentially parallel to the inner diffuser duet wall, and wherein the inner and outer diffuser duct walls jointly define at least a part of the buffer gas duct.

9. The turbocompound unit according to claim 1, wherein the sealing arrangement comprises an annular pressure cavity surrounding the turbine shaft, and wherein the annular pressure cavity is in fluid connection with the buffer gas duct.

10. The turbocompound unit according to claim 9, wherein the annular pressure cavity is arranged between two seals being spaced-apart axially along the turbine shaft.

11. The turbocompound unit according to claim 10, wherein at least one of the seals is a labyrinth seal.

12. The turbocompound unit according to claim 9, wherein the sealing arrangement further comprises an annular buffer cavity surrounding the turbine shaft, and wherein the annular buffer cavity is spaced-apart from the annular pressure cavity in an axial direction.

13. The turbocompound unit according to claim 12, wherein the annular buffer cavity is arranged between two seals being spaced-apart axially along the turbine shaft, and wherein one of the two seals is sealing the annular pressure cavity from the annular buffer cavity.

14. The turbocompound unit according to claim 12, wherein the annular buffer cavity is formed by a seal land being supported by an oil slinger.

15. The turbocompound unit according to claim 14, wherein the seal land comprises a through hole for draining fluid entering the annual buffer cavity.

16. A vehicle comprising a turbocompound unit according to claim 1.

17. A method for providing a turbocompound unit having a bearing housing and a turbine shaft being rotatably supported in the bearing housing, wherein one end of the turbine shaft is provided with a turbine wheel, the turbocompound unit further comprising a diffuser duct and in which the turbine wheel is arranged to rotate, an exhaust collector extending from the diffuser duct to an exhaust outlet, and a sealing arrangement positioned in the vicinity of the turbine wheel for preventing oil from escaping from the bearing housing to the diffuser duct, comprising     providing a buffer gas duct that is arranged to supply exhaust gas from the exhaust collector to the sealing arrangement for pressurizing the sealing arrangement.

\* \* \* \* \*